United States Patent
Ferlitsch

(10) Patent No.: US 7,301,663 B2
(45) Date of Patent: Nov. 27, 2007

(54) SYSTEMS AND METHODS FOR PRINT JOB ACCOUNTING

(75) Inventor: Andrew R. Ferlitsch, Tigard, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 1040 days.

(21) Appl. No.: 10/401,483

(22) Filed: Mar. 28, 2003

(65) Prior Publication Data

US 2004/0190014 A1 Sep. 30, 2004

(51) Int. Cl.
*G06F 15/00* (2006.01)
(52) U.S. Cl. .................. 358/1.15; 358/1.14; 399/79
(58) Field of Classification Search .............. 358/1.15; 399/79, 1.6, 1.14
See application file for complete search history.

(56) References Cited

U.S. PATENT DOCUMENTS

| | | | | |
|---|---|---|---|---|
| 6,064,838 | A * | 5/2000 | Maruta et al. ............... | 399/79 |
| 6,202,092 | B1 | 3/2001 | Takimoto | |
| 6,476,927 | B1 * | 11/2002 | Schwarz, Jr. .............. | 358/1.15 |
| 6,522,421 | B2 * | 2/2003 | Chapman et al. .......... | 358/1.15 |
| 6,618,566 | B2 * | 9/2003 | Kujirai et al. .............. | 399/79 |
| 7,016,060 | B1 * | 3/2006 | Carney et al. ............. | 358/1.15 |
| 7,113,299 | B2 * | 9/2006 | Suzuki et al. .............. | 358/1.15 |
| 2002/0004756 | A1 * | 1/2002 | Umehara .................... | 705/26 |
| 2002/0016921 | A1 | 2/2002 | Olsen et al. | |
| 2002/0078275 | A1 | 6/2002 | Yamaguchi | |
| 2002/0131070 | A1 | 9/2002 | Housel et al. | |
| 2002/0178128 | A1 * | 11/2002 | Chen et al. ................. | 705/400 |
| 2003/0090705 | A1 * | 5/2003 | Ferlitsch .................... | 358/1.15 |
| 2003/0227643 | A1 * | 12/2003 | Reddy et al. .............. | 358/1.13 |
| 2006/0044590 | A1 * | 3/2006 | Ferlitsch et al. .......... | 358/1.14 |
| 2006/0198653 | A1 * | 9/2006 | Plewnia et al. ............. | 399/79 |
| 2007/0035762 | A1 * | 2/2007 | Wilsher et al. ............ | 358/1.14 |
| 2007/0182984 | A1 * | 8/2007 | Ragnet et al. ............. | 358/1.15 |

FOREIGN PATENT DOCUMENTS

| | | |
|---|---|---|
| EP | 1 100 003 | 5/2001 |
| JP | 2001-312377 | 11/2001 |

\* cited by examiner

*Primary Examiner*—Kimberly A. Williams
(74) *Attorney, Agent, or Firm*—Madson & Austin

(57) ABSTRACT

A system for print job accounting in a computer system is disclosed. The system includes a computing device and a printer in electronic communication with the computing device. Executable instructions are disposed in an electronic communication path between the printer and the computing device and are configured to add to a print job a new address as a destination for a status message. A pre-print analysis of the print job is performed. The instructions determine if the print job should be sent to a printer based on the pre-print analysis. The print job is sent to the printer. The status message is received that includes actual performance information relating to the print job. The actual performance information is communicated to an accounting system. In addition, the status message is sent to a monitor program.

28 Claims, 12 Drawing Sheets

SYSTEMS AND METHODS FOR PRINT JOB ACCOUNTING

TECHNICAL FIELD

The present invention relates generally to printing through use of a computer. More specifically, the present invention relates to systems and methods for print job accounting in a computer system.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Different kinds of computer software facilitate the printing of materials through use of a printer and/or a computer network. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

In certain computing environments, it is desirable to track information that relates to each print job. The information that is tracked may be used for a variety of reasons. Tracking information relating to each print job may be referred to herein as print job accounting. Benefits may be realized by providing increased functionality to the software used in printing and print job counting.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
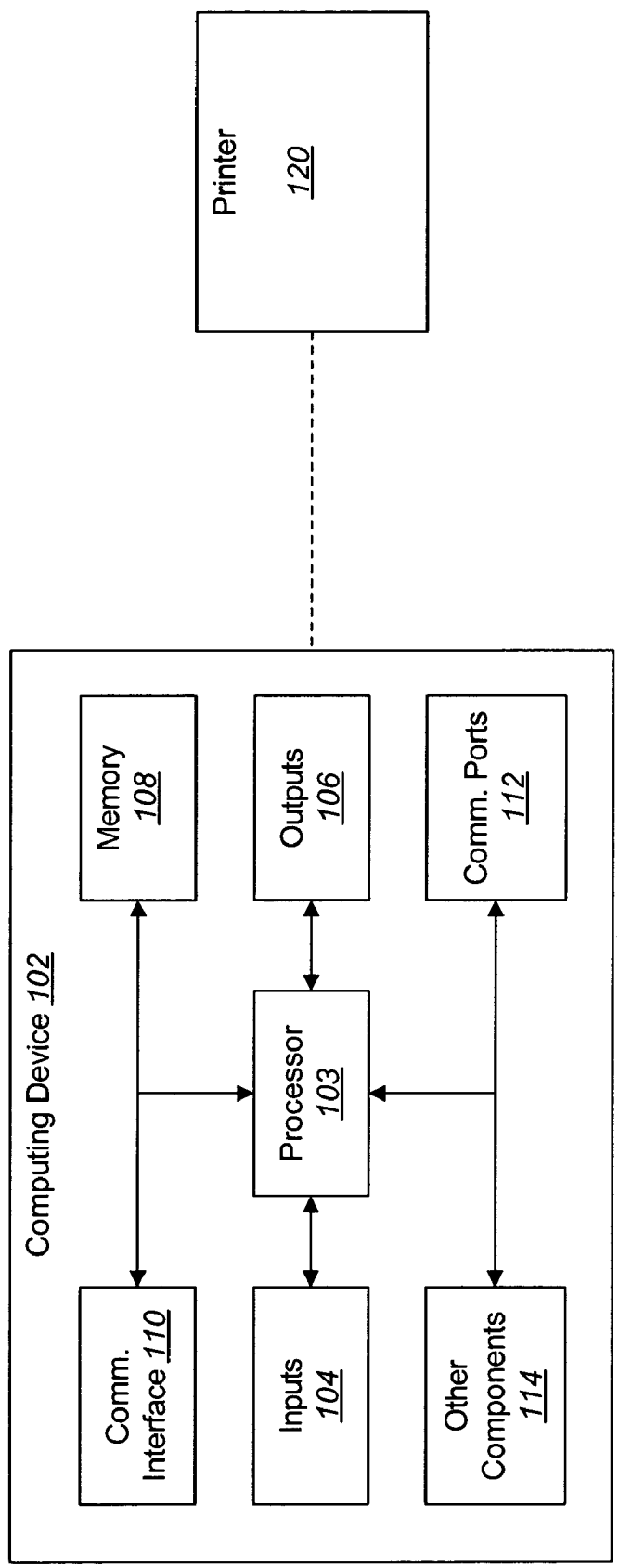
FIG. 1 is a block diagram illustrating the major hardware components typically utilized in a computing device used with embodiments herein.

A method for print job accounting in a computer system is disclosed. A new address is added to a print job as a destination for a status message. A pre-print analysis of the print job is performed. Based on the pre-print analysis it is determined whether the print job should be sent to a printer. The print job is then sent to the printer. The status message is received that includes actual performance information relating to the print job. The actual performance is communicated to an accounting system. Further, the status message is communicated to a monitor program.

In one embodiment of the method disclosed, a print command is executed in an application. The print job is generated in response to the print command.

A debit system may be used to determine if the print job should be sent to the printer. The print job may be canceled if it was determined that the print job should not be sent to the printer based on the pre-print analysis.

The actual performance information may indicate whether the printer successfully printed the print job. Regarding the status message, it may include a job completion notice. The status message may be sent by the printer to a single destination.

An originating computing device identification may be obtained from the print job. Job identification information may also be obtained from the print job. The originating computing device identification and the job identification information may be saved in a job database.

An originating monitoring process identification in the print job may be replaced with a replacement monitoring process identification.

In an embodiment, the print job may be identified in a job database after the status message has been received. A final accounting transaction may be determined for the print job. The final accounting transaction for the print job may be sent to the accounting system.

Communicating the status message to a monitor program may include duplicating a job completion notice and retransmitting the duplicated job completion notice from a replacement monitor program to an originating monitor program.

The method disclosed may be stored on a computer-readable medium for storing program data. The program data may include executable instructions for implementing the disclosed method.

A system for print job accounting in a computer system is also disclosed. The system includes a computing device and a printer in electronic communication with the computing device. Executable instructions are disposed in an electronic communication path between the printer and the computing device such that the executable instructions are configured to implement a method for print job accounting.

The method for print job accounting in a computer system may include adding to a print job a new address as a destination for a status message. A pre-print analysis of the print job is performed. Based on the pre-print analysis it is determined whether the print job should be sent to a printer. The print job is then sent to the printer. The status message is received that includes actual performance information relating to the print job. The actual performance is communicated to an accounting system. Further, the status message is communicated to a monitor program.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating the major hardware components typically utilized with embodiments herein. The systems and methods disclosed may be used with a computing device 102 and a printer 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106. The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures.

The electronic device 102 may also include memory 108. The memory 108 may be a separate component from the processor 103, or it may be on-board memory 108 included in the same part as the processor 103. For example, microcontrollers often include a certain amount of on-board memory.

The processor 103 is also in electronic communication with a communication interface 110. The communication interface 110 may be used for communications with other devices 102. Thus, the communication interfaces 110 of the various devices 102 may be designed to communicate with each other to send signals or messages between the computing devices 102.

The computing device 102 may also include other communication ports 112. In addition, other components 114 may also be included in the electronic device 102.

Of course, those skilled in the art will appreciate the many kinds of different devices that may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 1 is only meant to illustrate typical components of a computing device 102 and is not meant to limit the scope of embodiments disclosed herein.

The computing device 102 is in electronic communication with the printer 120. As used herein the term printer is broadly defined as any imaging device. Imaging devices include, but are not limited to, physical printers, multifunctional peripherals, a printer pool, a printer cluster, a fax machine, a plotter, a logical device, a computer monitor, a file, etc. Imaging devices are well known by those skilled in the art.

In light of the definition of printer above, the term print job, as used herein, is broadly defined as any instruction or set of instructions that are sent to an imaging device to cause an image to be printed, imaged, sent, etc., to the imaging device. Thus, the term print job includes, but is not limited to, a fax instruction or job to send a fax, a print job to print to a file, a print job to print to a particular window in a graphical user interface, a print job to print to a physical printer, etc. The term print job does not simply refer to a printing instruction sent to a physical printer but, as explained, has a much broader definition.

Figure 2:
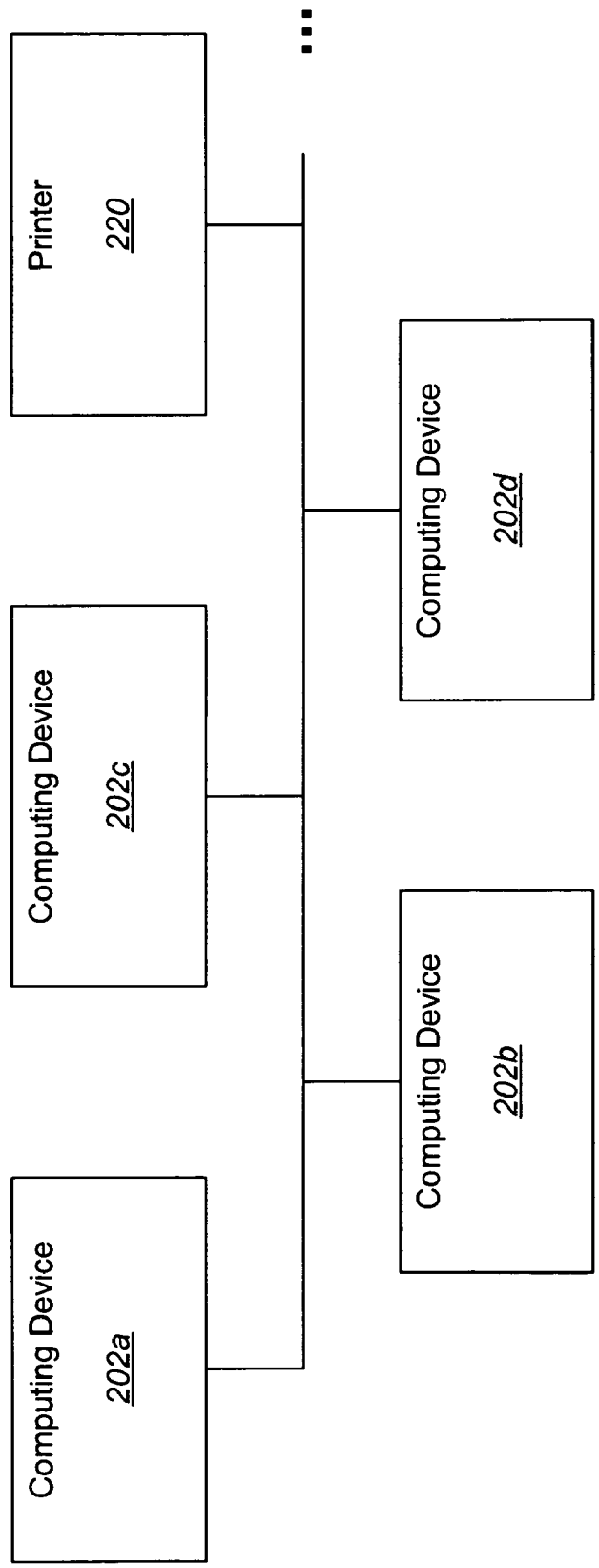
FIG. 2 is a network block diagram illustrating an environment in which the present systems and methods may be implemented.

FIG. 2 is a network block diagram illustrating an environment in which the present systems and methods may be implemented. The present systems and methods may also be implemented on a standalone computer system. FIG. 2 illustrates a computer network comprising a plurality of computing devices 202 and a printer 220. Many different kinds of computer networks are known by those skilled in the art.

Figure 3:
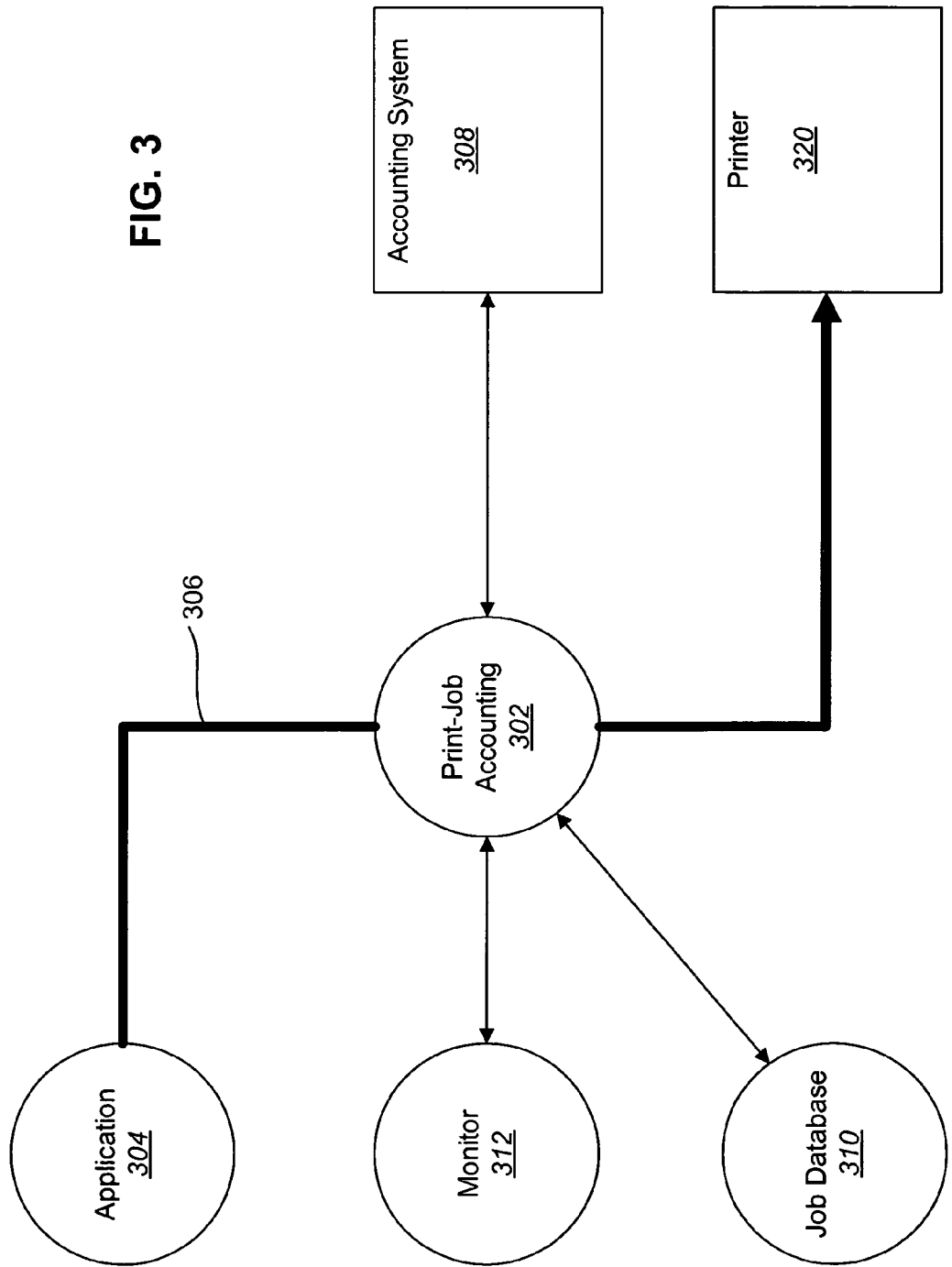
FIG. 3 is a context software block diagram for print job accounting.

FIG. 3 is a software block diagram to provide a context for the systems and methods herein. The systems and methods described herein may be implemented on one or more computers. In addition, a computer network may be involved. Because of the different embodiments that are possible, the elements shown in FIG. 3 will be discussed generally. Following FIGS. 3 and 4, several embodiments will be illustrated and discussed.

A print job accounting process 302 is disposed in between the printer 320 and the application 304 sending the print job. Thus, the print job accounting process is upstream from the printer 320. The electronic communication path 306 between the printer 320 and the originating application 304 is shown.

The print or imaging job accounting process 302 is in electronic communication with an accounting system 308 and a job database 310. The accounting system 308 is known in the art and generally tracks usage for various accounts. The job database 310 is a database of print or imaging jobs. The print job accounting process 302 may also be in electronic communication with the monitor 312. The monitor 312 is a monitor that may have already been within the system and is being used to monitor print jobs. Further details about embodiments of these different components will be more fully discussed below.

With the print job accounting process 302 implemented as shown in FIG. 3, it may perform pre-print analysis of the print data upstream from the printer or printing device 320. As a result, it may be used to support a debit system and it may also be used to authorize a print job before despooling to the printer 320. The print job accounting process 302 may also confirm the completion or partial completion of a print job.

The print job accounting process 302 is also compatible with single address responding printing devices 320. That is, it is compatible with a single notification message from the printing device to indicate job completion status.

The monitor 312 shown is an existing monitoring program or device. The print job accounting process 302 may communicate with the original monitor 312 in order to maintain the functionality of an existing original workstation monitoring program.

With the print job accounting process 302 as shown, the originating application 304 or source 304 and the printing or imaging device 320 do not need to know of the accounting system 308. The print job accounting process 302 is aware of the accounting system 308 and may be used to interface with the accounting system 308.

Various embodiments of the print job accounting process 302 will be described and illustrated below. The print job accounting process 302 may be implemented in various ways, including embodiments where it is part of the operating system or where it is not part of the operating system. In addition, the process 302 may comprise more than one software component, or the functionality of the print job accounting process 302 may be achieved by one or more pre-existing components that have been modified accordingly.

Figure 4:
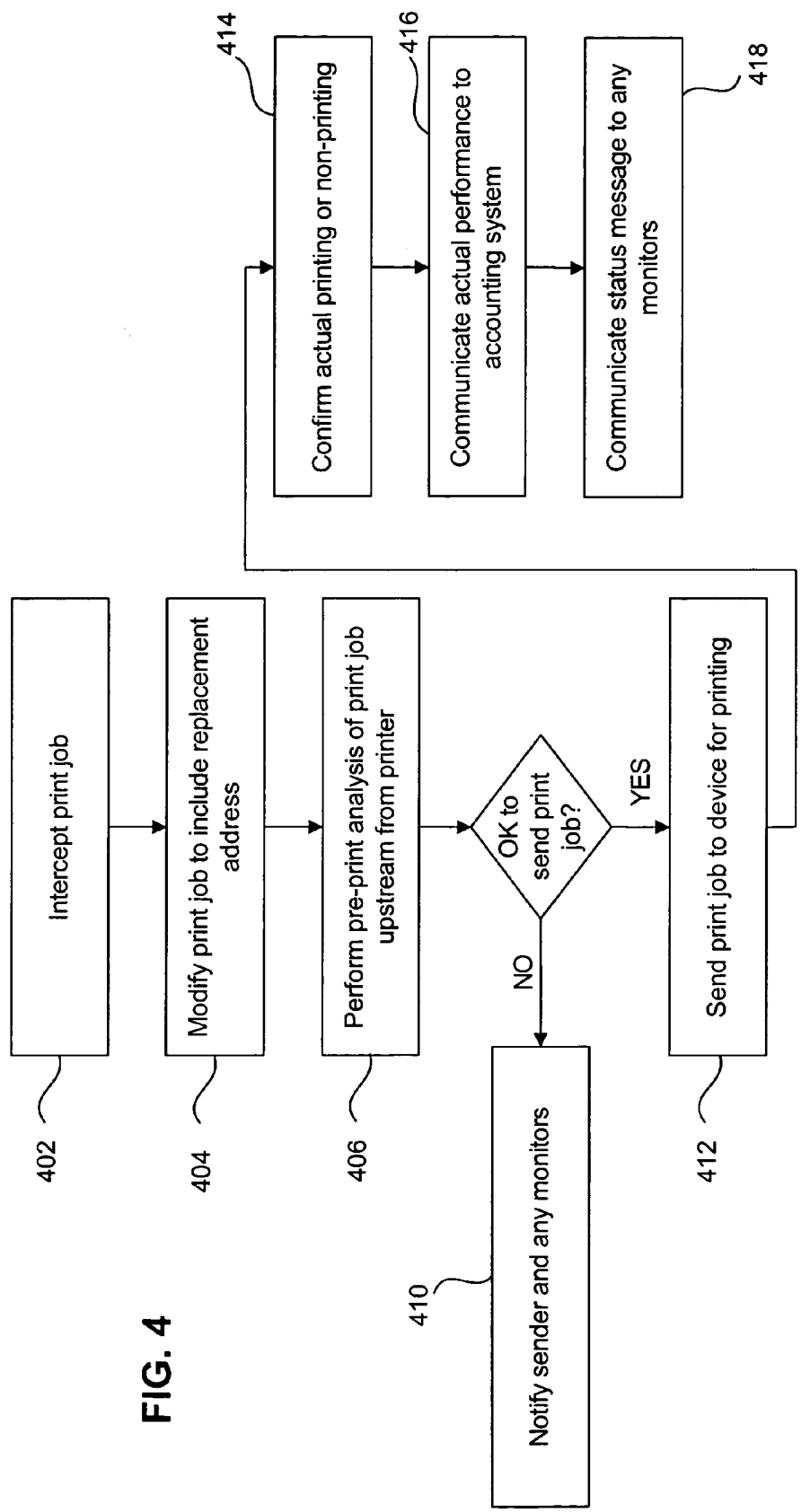
FIG. 4 is a flow diagram of one method of operation for enhanced print job accounting.

FIG. 4 is a flow diagram of one method of operation for a print job accounting process 302. The print job accounting process 302 is positioned in between the printer 320 and the source application 304 such that it can intercept 402 the print job. In other words, the print job accounting process 302 is in an electronic communication path between the printer 320 and the originating application 304 or originating computing device 202. It then modifies 404 the print job to include a replacement address so that the print job accounting process 302 will receive any notifications regarding the print job completion. If necessary, the print job accounting process 302 may perform 406 a pre-print analysis of the print job upstream from printer 320. If it is then determined 408 that the print job is authorized, the print job accounting process 302 may then send 412 the print job to the device for printing. If the print job is not authorized, the process 302 may notify 410 the sender and any monitors that the print job was not authorized.

The print job accounting process 302 receives communications from the printer 320 in order to confirm 414 the actual printing or non-printing of the item. The communication from the printer 320 may be in the form of a status message. Finally, the actual performance may be communicated 416 to the accounting system 308. In addition, the status message may be sent 418 to any monitors that were awaiting confirmation regarding the print job.

Systems and methods disclosed herein are directed toward print job accounting. Print job accounting generally refers to any sort of tracking information for print jobs and may include, but is not limited to, pre-calculating, calculating, authorizing, charging users for print jobs and confirming the successful completion of a print job.

Print job accounting may be performed as a pre-print analysis. In this case, the print data is analyzed somewhere in the print subsystem (e.g., print/fax driver, spooler, print processor, port manager) or print transmission (e.g., 3rd party box). The analysis is used to determine the number of logical pages and the sheet assembly options to calculate the number of physical sheets that will be printed and the type of paper. The analysis may also include analyzing the toner/ink usage and the long distance charges for a fax.

The print job accounting process 302 then communicates with an accounting system 308 and may optionally authenticate the user and/or account and/or perform pre-authorization such as in a debit system. The process would then wait for the printer 320 to acknowledge acceptance of the print job; at which time, the process then communicates with the accounting system 308 and charges the print job. A system may use an enhanced print processor on a print server to perform the pre-print analysis, authorization and account charging, such as the systems and methods disclosed in U.S. patent application Ser. No. 10/010,112 filed Nov. 13, 2001, for Providing Print Job Accounting in a Computer System Configuration, which is incorporated herein by reference. If the process only supports certain PDLs (Page Description Languages), the process may be PDL dependent. Some systems may use non-standard means for specifying sheet assembly options, in which case an analysis may not be possible until the process is updated so that it understands the options.

If the aforementioned process 302 did not communicate with the printer 320 regarding job completion, it may not detect incomplete jobs. Without such communication this process 302 would only detect, in a network printing environment, the acceptance of the job by the printer 320, and not necessarily the physical completion of the job. For example, the print subsystem may consider acceptance as the receipt of the job on a print server, receipt of a job spooled internally to a device, or the RIP, but not output, of a print job. RIP stands for Raster Image-Processor. A RIP is a process that takes imaging data (e.g., PDL) and converts it into a bitmap for printing.

Some printers and/or imaging devices have the ability to send a notification notice back to the originator upon successful completion and/or termination of a print job. Examples of such devices that support this capability are the Sharp AR-335/6/7, AR-405/7, AR-505/7, AR-M/P 350, AR-M/P 450, AR-235/N, AR-275/N and Ricoh Alficio 1022.

Generally speaking, the printing device 320 obtains the network address of the originating computing device 202 by extracting it from the print job. One method is to embed a PJL (Printer Job Language) statement indicating the IP address of the originating computing device 202 and a port of a monitoring process 312 on the computing device 202. The device 320 would then send job completion notifications to the specified port at the specified IP address. In this system, the pre-print analysis component would not charge and/or reverse the charge, until a job completion notice is returned from the printing device 320. In this case, the system would require a monitor that waits on the message from the device 320.

In another method, print job accounting is performed internally in the device 320. This method has the advantage that the device 320 can simply count the number and type of physical sheets that are outputted. This makes the method independent of the PDL, and confirms completion of the job. Generally, the device 320 is configured for one or more accounts. When transmitting a print job, the print job has embedded an account code. The device 320 confirms the account code for authorization, prints/faxes/images the job and updates the internal accounting database. Later, accounting totals can be extracted from the device, generally through a front panel interface.

The print job accounting process 302 may provide improvements relating to pre-calculating, calculating, authorizing, charging users for print jobs and confirming the successful completion of a print job. The print job accounting process 302 may be configured to provide any one or more of the following features. In addition, further benefits may also be realized by those skilled in the art.

An embodiment of a print job accounting process 302 may perform a pre-print analysis of the print data upstream from the device 320. The process 302 may be used to support a debit system. Because of the position of the process 302, it can authorize a job before despooling to the device 320. The print job accounting process 302 may confirm the completion, or partial, of a print job.

The systems and methods herein may be compatible with single address (i.e., single notification message) responding printing devices 320. Furthermore, they maybe used in such a way so as to maintain the functionality of existing origination workstation monitoring. It is not necessary that the origination source and imaging device 320 know of the accounting system 308.

Figure 5:
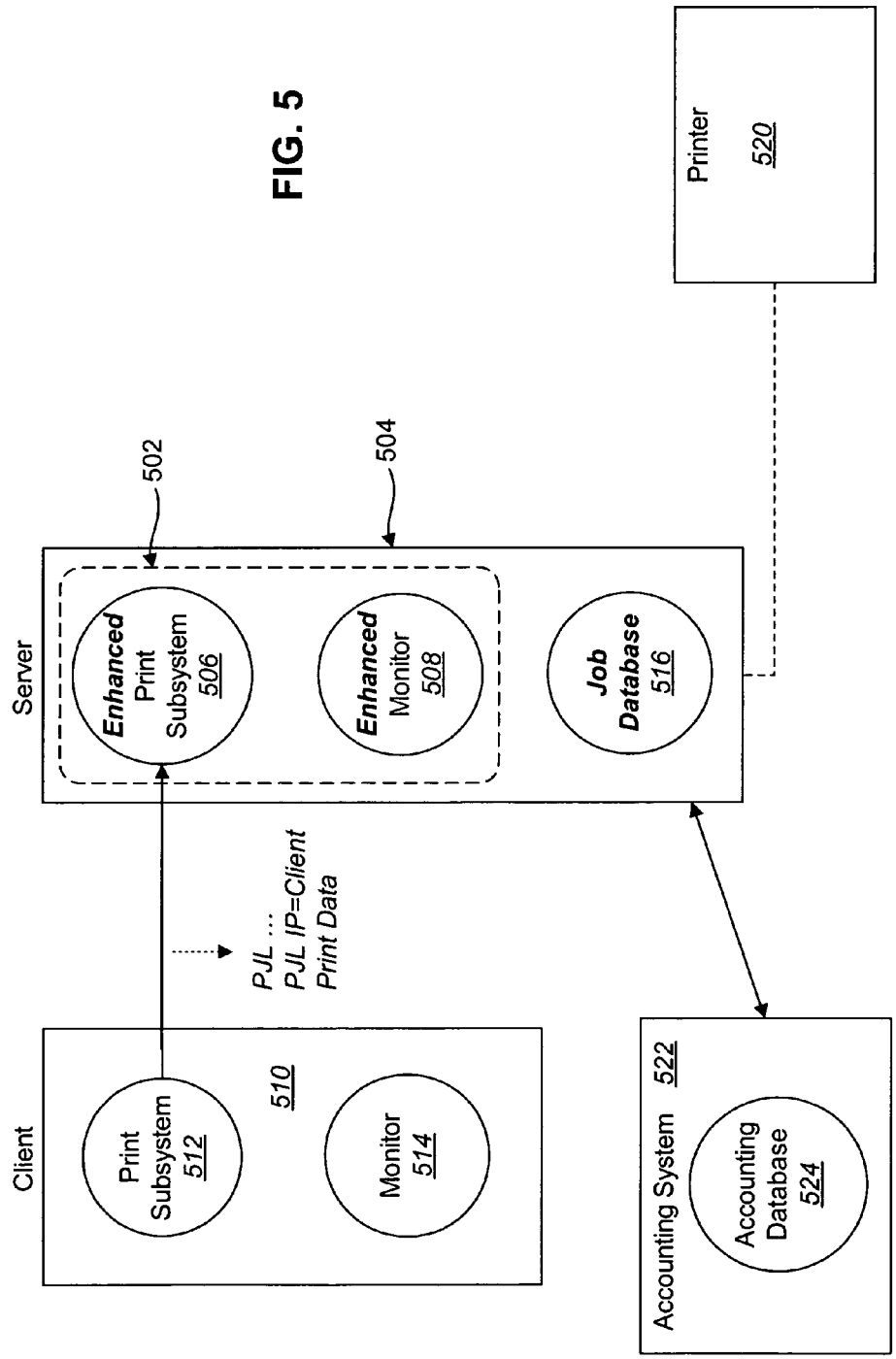
FIG. 5 is a block diagram illustrating enhanced print job accounting in an embodiment of a print server.

FIG. 5 is a block diagram illustrating an embodiment of a print job accounting process 302 that accomplishes inline network address replacement and retransmission for print job accounting. In the embodiment of FIG. 5, the server 504 includes the print job accounting process 502. The print job accounting process 502 comprises an enhanced print subsystem 506 and an enhanced monitor 508. The term enhanced is used to denote that additional functionality has been added to accomplish the functionality of the print job accounting process 502.

A client 510 includes a print subsystem 512 and a monitor 514. The print job is transmitted from the print subsystem 512 to the server 504 and is received by the enhanced print subsystem 506 on the server 504. A job database 516 tracks the various print jobs. The enhanced monitor 508 on the server 504 helps to achieve, some of the functionality set forth earlier in relation to the print job accounting process 502.

The computer based printing system may also include one or more print or imaging drivers, a spooler, and one or more print processors. One or more printing devices 520 are in electronic communication with the server 504. The server 504 is an optional component. A plurality of servers may also be utilized, if so desired.

The system shown in FIG. 5 may perform a number of tasks including but not limited to pre-calculating, calculating, authorizing, charging users for a print job and confirming the successful completion of the print job, in a manner that does not interfere with the existing monitoring subsystem. Further, it does not typically require knowledge of the accounting system by the print origination and imaging device, and does not typically require imaging devices to support multiple destination job completion notices.

The accounting system 522 is also in electronic communication with the print job accounting process 502. The accounting system 522 may include an accounting database 524.

The systems and methods described herein may be independent of the method to initiate the print job, and the method of transmitting the print job to a printing device. There are several different ways in which the print job may be initiated. For example, the print job. may be generated by a printer driver from an application 304. The application 304 may convert the document into printing instructions, such as GDI (i.e., Graphics Device Interface) in the Microsoft Windows® family of operating systems. The printing instructions would then be passed to a printer driver installed on the client 510 and/or server 504 associated with the printing device 520. The printer driver would then convert the printing instructions into a printer dependent format, such as a raster image or PDL. In other cases, such as Direct Printing, the document format can be directly interpreted by the printer 520 and there is no preprocessing of the document format into a printer dependent format.

The systems and methods herein may be independent of the method by which the device 520 confirms the job completion to a monitoring process or program. For example, the device 520 may send an SNMP (Simple Network Management Protocol) message, via trap, send an email message, or use a proprietary protocol such as Sharp NJR to the monitoring process or program.

The accounting system 522 shown may be a typical accounting system that is commercially available for print job charges. An accounting database 524 is typically included in the accounting system 522. The systems and methods herein may be independent of the implementation of the accounting database 524.

The print job accounting process 502 and embodiments thereof may be disposed in various places upstream from the printer or imaging device 520. The print job accounting process 502 and embodiments thereof may be independent of the location of the system upstream from the printer or imaging device 520. For example, the print job accounting process 502 may be implemented in the originating computing device 510, a print server 504 or a third party component inserted somewhere along the print transmission path. In the embodiment shown in FIG. 5 the functionality of the print job accounting process 502 is described as being located in the print server 504.

The system may further be independent of the component at the location where the system is implemented. For example, it may be implemented in a printer driver, print submission application, print spooler, print processor, port manager, or a third party custom component (e.g., print assist) added anywhere along the print transmission path where use of print or printer can also mean image or imager.

Descriptions of client/server based print subsystems below are done in the context of the Microsoft Windows® operating system, but are not meant otherwise to limit the application of the systems and methods disclosed herein.

In the embodiment of FIG. 5, the print job, prior to despooling from a client, is created or modified to contain the network address of the client computing device and port, or other identification, of the monitoring process 514. The monitoring process 514 may be a process such as but not limited to the Sharp Status Monitor. One possible example of the command syntax for the network address and port in the print job may be of the form such as in Sharp Status Monitor, as follows:

@PJL IPADDRESS=172.20.13.2:54567

Other associated information may also be embedded in the print job to uniquely identify the job instance, such as the name of the local installed printer, document name and/or job identification number.

The above commands may be inserted anywhere along the print transmission path upstream from the imaging device 520. In an embodiment, the commands are added to the print data in the print subsystem of the client computing device 510. For example, the printer driver or print submission application, such as in driverless printing, would add the commands during the generation of the print data. In another example, the commands may be added after the creation of the print job, but prior to despooling the print data to the output destination (e.g., printer, print server). For example, an enhanced print processor or custom port manager may modify the print data to add the respective commands.

In another embodiment, the commands may be added to the print data after despooling from the client computing device 510, but prior to the imaging device 520, by another component in the print transmission path. For example, the commands may be added by a print server or third party box.

It will be appreciated by those skilled in the art that the functionality of the print job accounting process 302 may be included in one or more software components. As a result, the following embodiments include the functionality of the print job accounting process 302 in one or more other software components, as will be described.

Figure 6:
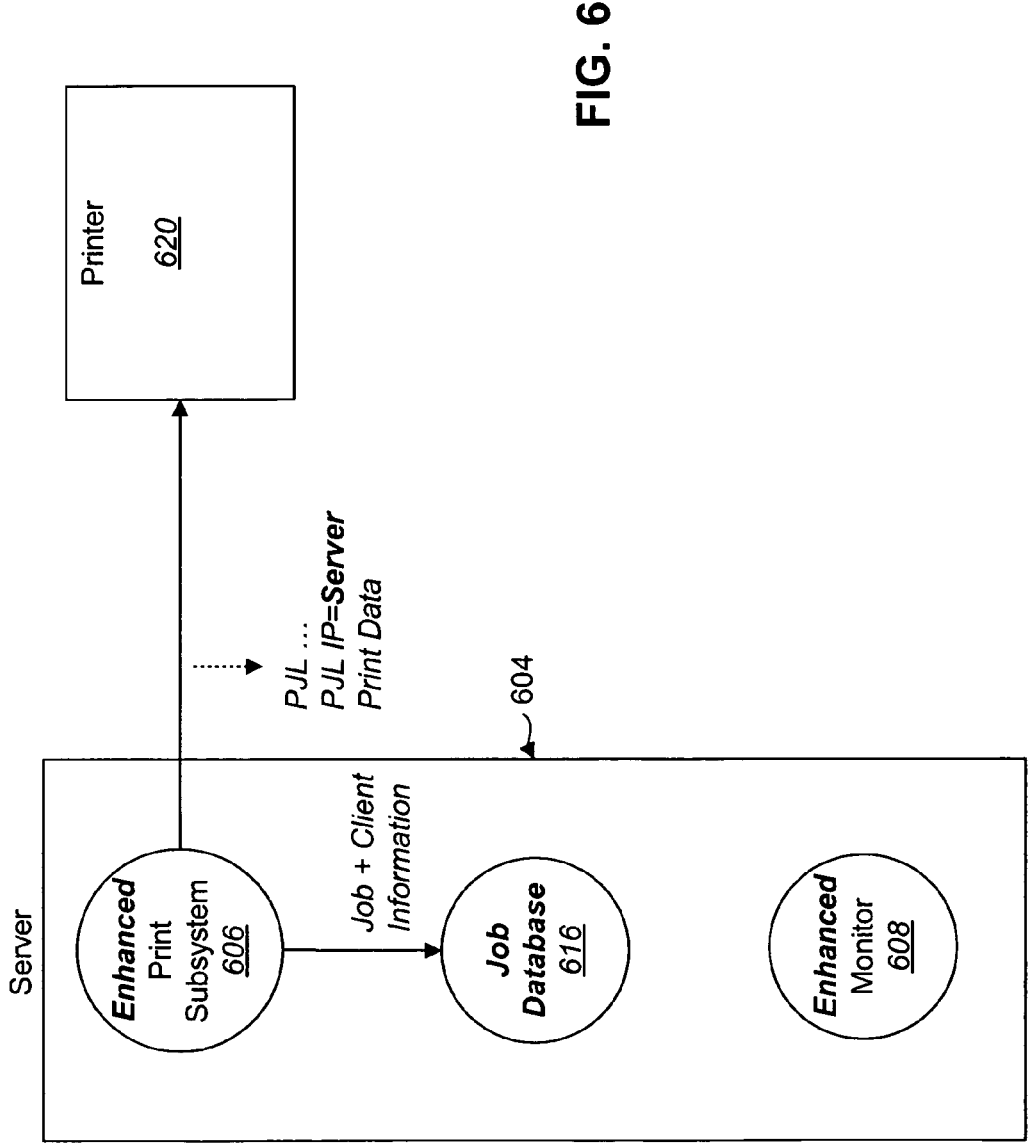
FIG. 6 is another block diagram illustrating enhanced print job accounting in an embodiment of a print server.

FIG. 6 is a block diagram illustrating a network address of the client embedded in print job being changed to the server 604. In one embodiment, the print job is despooled to a print server 604. The embodiment of the print server 604 of FIG. 6 includes an enhanced print subsystem 606, a job database 616 and an enhanced monitor 608.

The enhanced print subsystem 606 performs a pre-print analysis of the print job to locate the commands that identify the network address of the originating computing device, the port of the monitoring device, and any other job identification information. This process may be performed by any component in the print subsystem in the print server 604, prior to despooling the print data to the output destination 620 (e.g., printer). For example, the process may be performed by an enhanced print spooler, a custom print processor, custom port manager or a custom component added to the existing print subsystem (e.g., print assist).

The process may also analyze the print data to pre-calculate the costs of the print job, such as calculating the number of sheets and paper type to be printed, type of ink (black and white vs. color) and special finishing options, such as stapling.

In the case of a pre-print analysis of the job cost, the information may be sent to the accounting system 522 for pre-authorization. For example, the system 522 may be used to deploy a debit accounting system whereby a user/account must have sufficient funds in an account for the entire job. Other authorizations may occur as well, such as authenticating the user and/or account.

If a job is authorized, the originating client computing device 202 and job identification information that was extracted may be saved in a job database 616. In one embodiment, the job database 616 is on the print server 604. In other embodiments, the job database 616 may be built into the accounting server or in offline storage.

After performing any pre-print analysis and authorization, the process then modifies the embedded commands in the print job that identify the network address of the originating computing device and monitoring process, so that the message sent from the imaging device 620 will go to a different monitoring process 608, the enhanced monitor 608.

In the embodiment of FIG. 6, the enhanced monitoring process 608 is on the print server 604. In this case, at least the network address embedded in the print job would be changed from the originating computing device to the print server 604.

Figure 7:
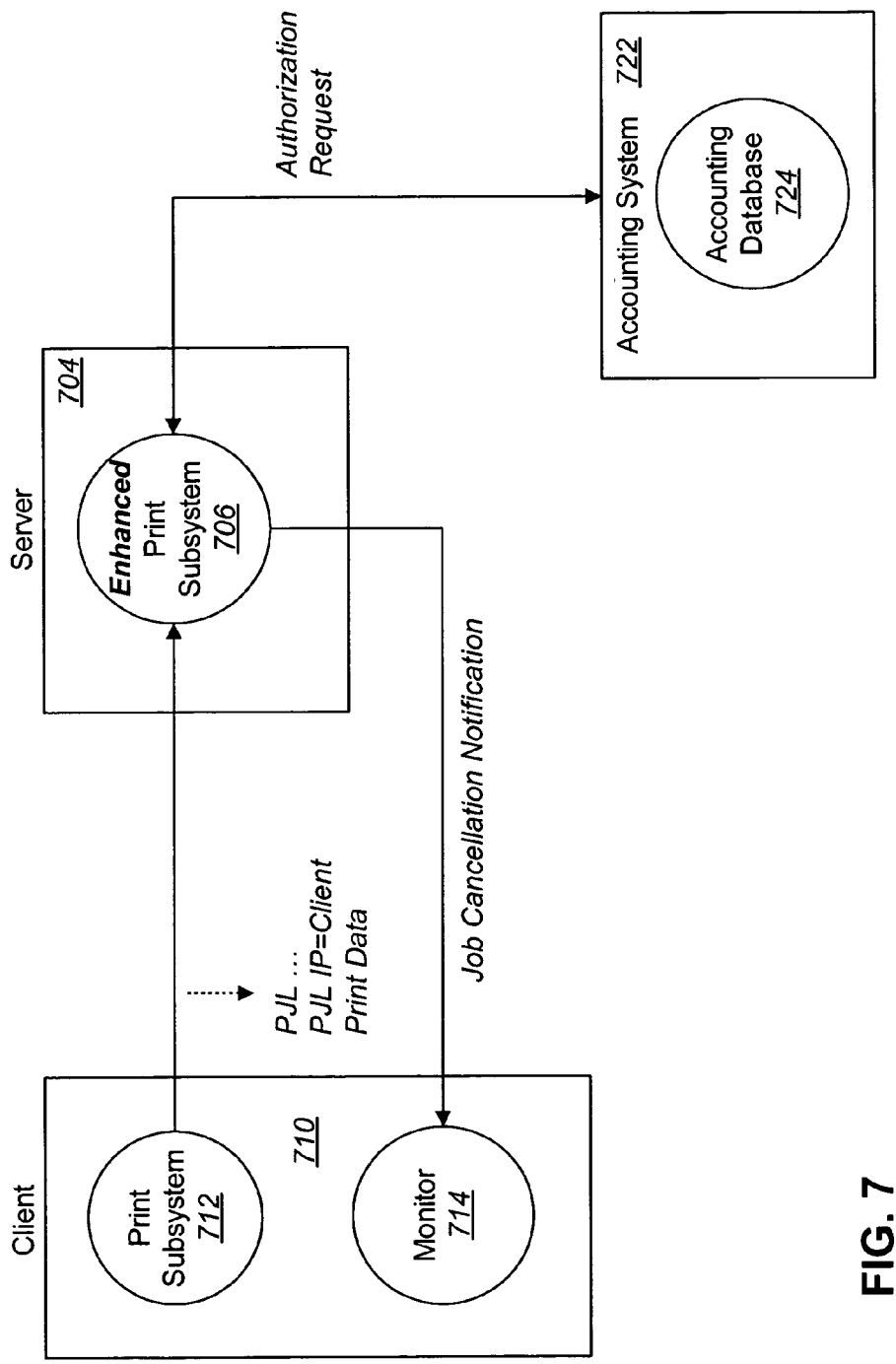
FIG. 7 is a block diagram illustrating a scenario where the print job is not authorized and that is further canceled by the print server.

FIG. 7 is a block diagram illustrating a scenario where the print job is not authorized and that is further canceled by the print server 704. If the job is not authorized, the print job may be canceled. In the embodiment of FIG. 7, a message is sent back to the originating computing device 710 that conforms to the monitoring system 714 on the originating computing device 710, to indicate that the job was canceled. The extracted originating client computing device and job identification information are used to generate this message.

Figure 8:
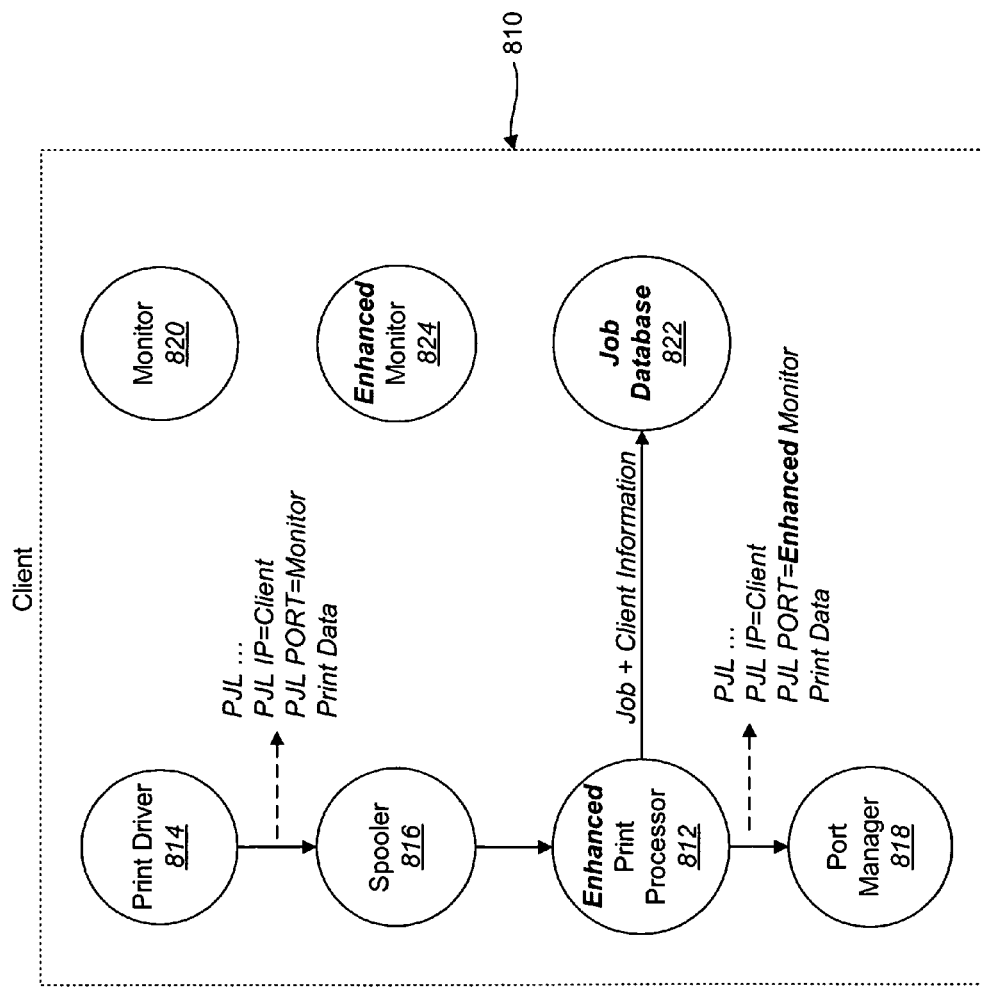
FIG. 8 is an embodiment illustrating address replacement and a job database being built into the client computing device.

FIG. 8 is an embodiment illustrating address replacement and a job database being built into the client computing device 810. The embodiment of FIG. 8 is different from the earlier embodiments in that the address replacement and the job database are built into the client computing device 810.

The enhanced print processor 812 is downstream from the process that generated the original embedded commands in the print job. For example, the generation of the embedded commands relating to the originating computing device 810 and monitoring process could occur in the printer or imaging driver 814. The process for extracting the information on the originating computing device and job information could be done downstream, such as in the print spooler 816, print processor 812, port manager 818 or print assist (not shown).

It is also possible that the processes could be combined and performed by the same print component. For example, the printer or imaging driver 814 may be configured to insert the network address of the originating computing device 810 and monitoring process 820 or other computing device/monitor (see below), enter the appropriate information into the job database 822 and do any other pre-print analysis and authorization.

The embedded command identifying the monitoring process 820 may be changed to the enhanced monitoring process 824.

In yet another embodiment, the replacement network address of the originating computing device may be the accounting server itself.

Figure 9:
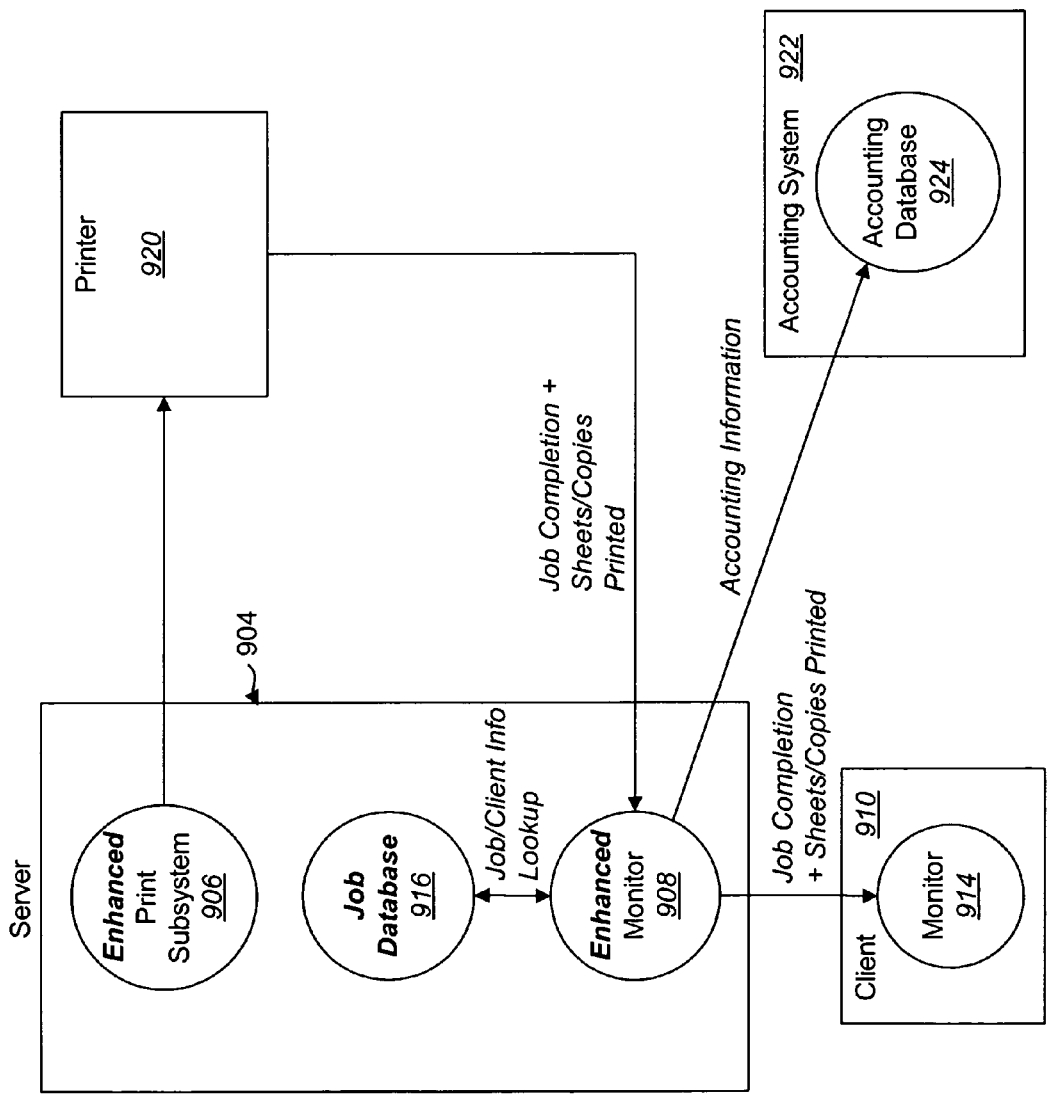
FIG. 9 is a block diagram illustrating an embodiment where the enhanced monitor. receives a job completion notification and retransmits it to the originating monitor.

FIG. 9 is a block diagram illustrating an embodiment where the enhanced monitor 908 receives a job completion notification and retransmits it to the originating monitor 914. In this embodiment the network address and port of the monitoring process extracted from the print job by the imaging/printing device 920 is the enhanced monitoring process 908. Also in this embodiment, the enhanced monitoring process 908 is on the print server 904.

The enhanced monitoring process 908 receives the job completion, or termination, notice from the imaging device 920 as if it was the monitoring process on the originating computing device 910. The job completion notice contains at least a means to identify the print job and the completion status of the print job, which may include, but is not limited to:

Completed
Completed, but with problems
Interrupted with problems
Interrupted by user
Canceled with problems
Canceled by user In a more advanced response, the information on the number of sheets and copies printed, paper type and ink used is also returned. This additional information could be used in several different ways, such as, but not limited to: confirming pre-print calculation of charges, determining post-print calculation of charges when no pre-print calculation is supported, and determining partial charges when a job is partially completed and the remainder canceled.

The enhanced monitoring process 908 then looks up the print job from the job database 916, using the job identification information obtained from the job completion notice, to locate the print job transaction. The enhanced monitoring process 908 may then determine the final accounting transaction for the print job and may send the transaction to the accounting database 924. The message sent to the accounting database 924 may comprises instructions including, but not limited to:

Committing a transaction.
Charging a transaction.
Reversing all or part of a transaction.

Regardless of the outcome of the transaction, the enhanced monitoring process 908 duplicates the original job completion response and retransmits the duplicated message to the monitoring process 914 on the originating computing device 910. The network address and port of the monitoring process 914 on the originating computing device 910 is obtained from the information stored in the job database 916. The monitoring process 914 on the originating computing device 910 then receives the duplicated message and performs its normal function.

Figure 10:
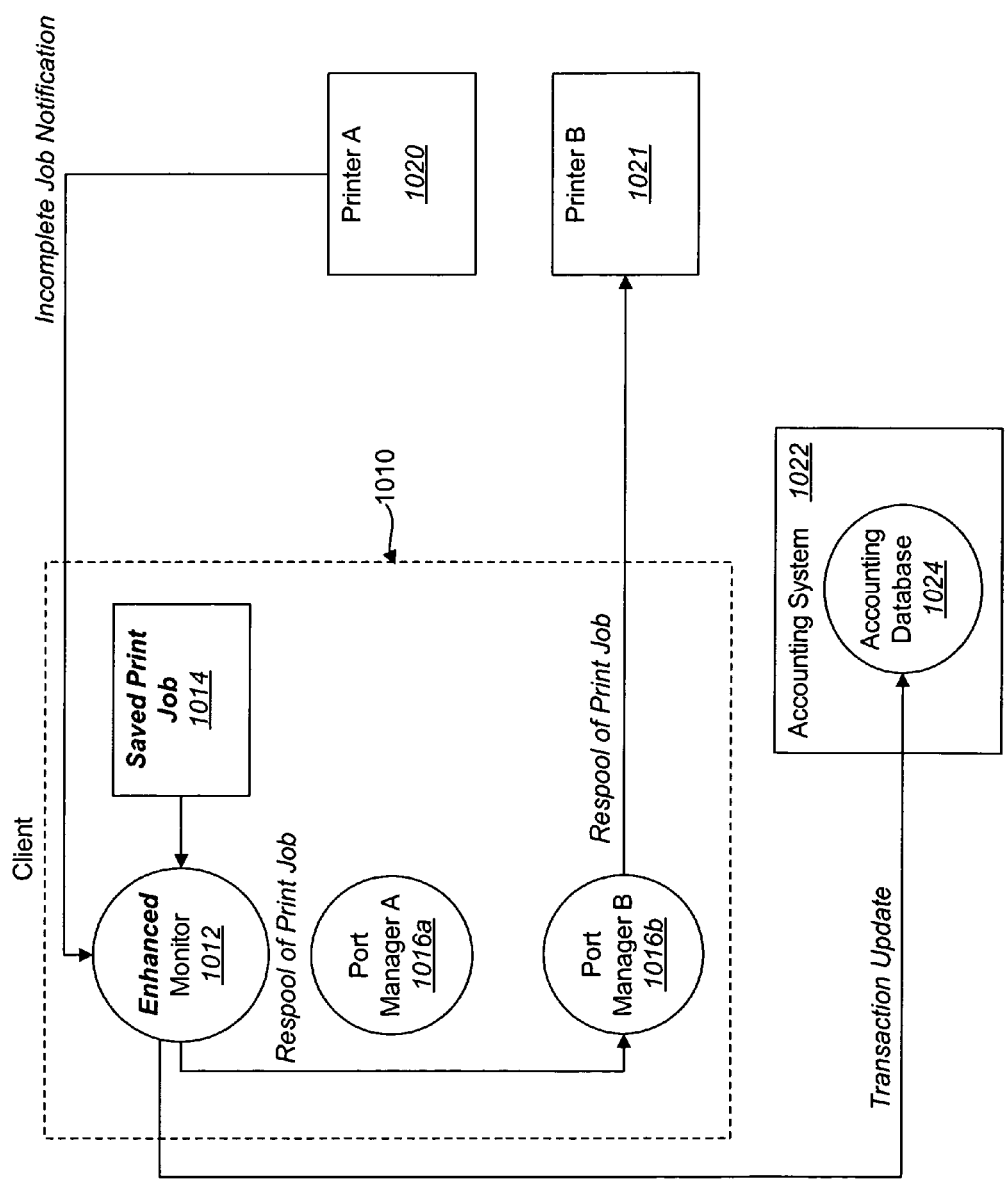
FIG. 10 is a block diagram illustrating incomplete job handling by the enhanced monitor.

FIG. 10 is a block diagram illustrating incomplete job handling by the enhanced monitor 1012. If the job completion notification indicates that the job was incomplete, the enhanced monitoring process 1012 may also take additional actions. These actions may relate to, but are not limited to: rollover and restart. The rollover actions may include (a) roll back the transaction from the accounting database 1024, (b) create a new transaction and/or (c) rollover the job to an alternate imaging device 1021. The restart actions may include (a) roll back unprinted portion of transaction from the accounting database 1024, (b) create a new transaction and/or (c) restart unprinted portion of print job to an alternate imaging device 1021.

The enhanced monitor 1012 may use a saved print job 1014 to resend the print job. Port managers 1016 may be used in sending print jobs to printing devices 1020, 1021.

Figure 11:
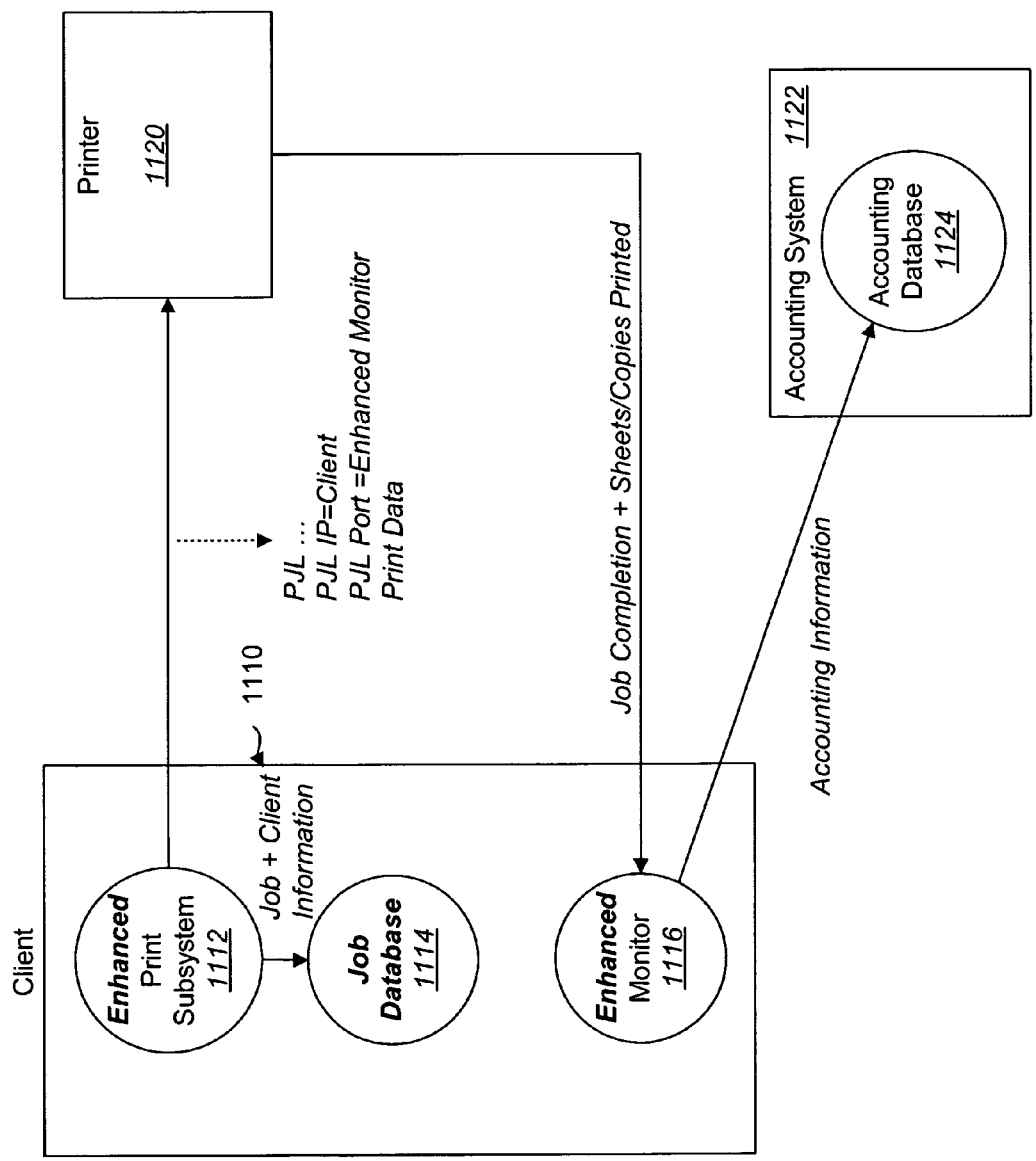
FIG. 11 is a block diagram of an embodiment where an enhanced print subsystem/monitor is combined into the client subsystem.

FIG. 11 is a block diagram of an embodiment where an enhanced print subsystem/monitor 1112 is combined into the client subsystem 1110. In this embodiment, all of the enhanced print subsystem processes and enhanced monitoring processes may be implemented within the print subsystem and monitoring process of the originating computing device 1110. The client computing device 1110 includes the job database 1114 and the enhanced monitor 1116.

Figure 12:
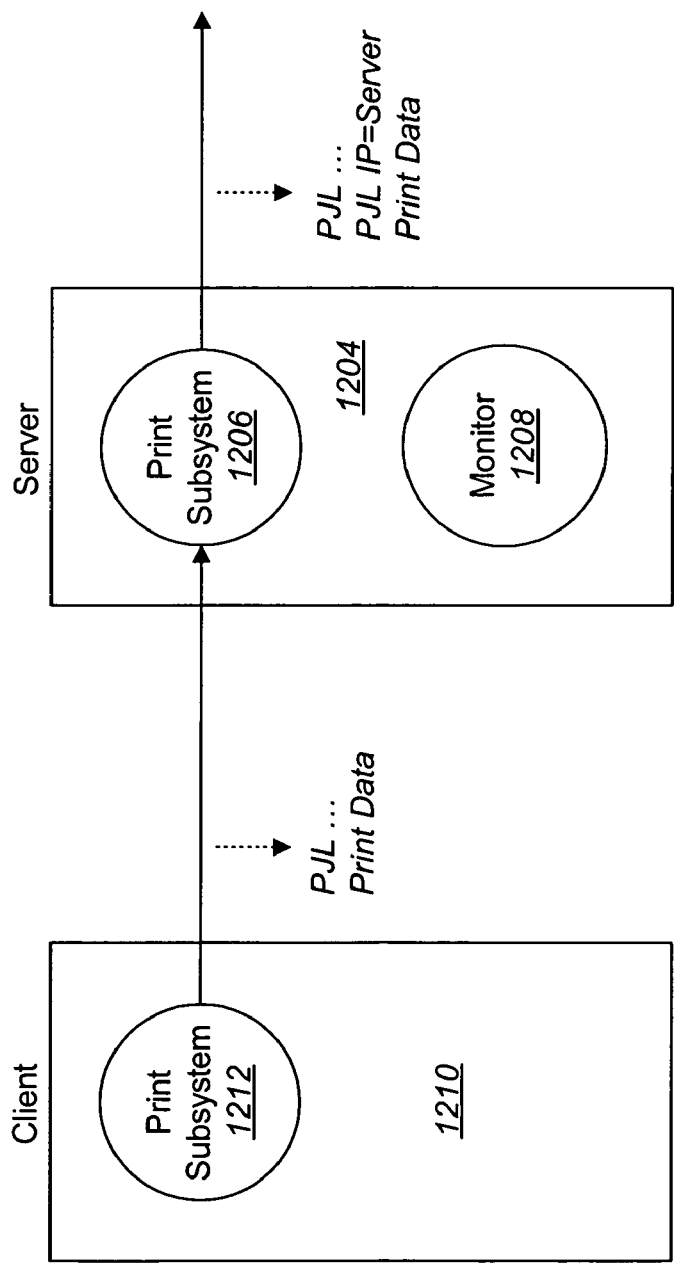
FIG. 12 is a block diagram of an embodiment where the network address of the client or the server in the print job is added by the print server.

FIG. 12 is a block diagram of an embodiment where the network address of the client 1210 or the server 1204 in the print job is added by the print server 1204. As shown, the commands may be added to the print data after despooling from the client computing device 1210, but prior to the imaging/printing device, by another component in the print transmission path. For example, the commands may be added by a print server or a third party box.

Those skilled in the art will appreciate that the present systems and methods may be implemented in many different embodiments. Other embodiments include but are not limited to the spooling and despooling subsystems of the Apple MacIntosh operating system, the Linux operating system, System V Unix operating systems, BSD Unix operating systems, OSF Unix operating systems, and IBM Mainframe MVS and AS/400 operating system.

Although use with a printer was illustrated, it will be appreciated that the present systems and methods may be applied to other embodiments. For example, the present systems and methods may be applied to fax and scan operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for print job accounting in a computer system, the method comprising:
   adding to a print job a new address as a destination for a status message;
   performing a pre-print analysis of the print job, wherein the pre-print analysis comprises communicating with a debit system and pre-authorizing the print job by verifying sufficient funds in a user account;
   determining if the print job should be sent to a printer based on the pre-print analysis;
   sending the print job to the printer;
   receiving the status message that includes actual performance information relating to the print job;
   communicating the actual performance to an accounting system; and
   communicating the status message to a monitor program.

2. The method of claim 1, further comprising:
   executing a print command in an application; and
   generating the print job in response to the print command.

3. The method of claim 1, wherein the communicating the status message to a monitor program comprises duplicating a job completion notice and retransmitting the duplicated job completion notice from a replacement monitor program to an originating monitor program.

4. The method of claim 1, wherein the actual performance information indicates whether the printer successfully printed the print job.

5. The method of claim 1, further comprising sending the status message, by the printer, to a single destination.

6. The method of claim 1, further comprising:
   obtaining an originating computing device identification from the print job;
   obtaining job identification information from the print job; and
   saving the originating computing device identification and the job identification information in a job database.

7. The method of claim 1, further comprising replacing an originating monitoring process identification in the print job with a replacement monitoring process identification.

8. The method of claim 1, further comprising canceling the print job if it was determined that the print job should not be sent to the printer based on the pre-print analysis.

9. The method of claim 1, wherein the status message comprises a job completion notice.

10. The method of claim 1, further comprising:
    identifying the print job in a job database after the status message has been received;
    determining a final accounting transaction for the print job; and
    sending the final accounting transaction for the print job to the accounting system.

11. A computer-readable medium for storing program data, wherein the program data comprises executable instructions for implementing a method in a computing device for print job accounting, the method comprising:
    adding to a print job a new address as a destination for a status message;
    performing a pre-print analysis of the print job, wherein the pre-print analysis comprises communicating with a debit system and pre-authorizing the print job by verifying sufficient funds in a user account;
    determining if the print job should be sent to a printer based on the pre-print analysis;
    sending the print job to the printer;
    receiving the status message that includes actual performance information relating to the print job;
    communicating the actual performance to an accounting system; and
    communicating the status message to a monitor program.

12. The computer readable medium of claim 11, wherein the method further comprises:
    identifying the print job in a job database after the status message has been received;
    determining a final accounting transaction for the print job; and
    sending the final accounting transaction for the print job to the accounting system.

13. The computer readable medium of claim 12, wherein communicating the status message to a monitor program comprises duplicating a job completion notice and retransmitting the duplicated job completion notice from a replacement monitor program to an originating monitor program.

14. The computer readable medium of claim 11, wherein the method further comprises:
    obtaining an originating monitor process identification from the print job;
    obtaining job identification information from the print job; and
    saving the originating monitor process identification and the job identification information in a job database.

15. The computer readable medium of claim 11, wherein the method further comprises replacing an originating monitor process identification in the print job with a replacement monitoring process identification.

16. The computer readable medium of claim 11, wherein the method further comprises canceling the print job if it was determined that the print job should not be sent to the printer based on the pre-print analysis.

17. A set of executable instructions on a computer readable medium for implementing a method in a computing device for print job accounting, the method comprising:
   adding to a print job a new address as a destination for a status message;
   performing a pre-print analysis of the print job, wherein the pre-print analysis comprises communicating with a debit system and pre-authorizing the print job by verifying sufficient funds in a user account;
   determining if the print job should be sent to a printer based on the pre-print analysis;
   sending the print job to the printer;
   receiving the status message that includes actual performance information relating to the print job;
   communicating the actual performance to an accounting system; and
   communicating the status message to a monitor program.

18. The set of executable instructions of claim 17, wherein the method further comprises:
   obtaining an originating monitoring process identification from the print job;
   obtaining job identification information from the print job; and
   saving the originating monitoring process identification and the job identification information in a job database.

19. The set of executable instructions of claim 18, wherein the method further comprises replacing an originating monitoring process identification in the print job with a replacement monitoring process identification.

20. The set of executable instructions of claim 19, wherein the method further comprises:
   identifying the print job in a job database after the status message has been received;
   determining a final accounting transaction for the print job; and
   sending the final accounting transaction for the print job to the accounting system.

21. The set of executable instructions of claim 17, wherein the actual performance information indicates whether the printer successfully printed the print job.

22. A system for print job accounting in a computer system, the system comprising:
   a computing device;
   a printer in electronic communication with the computing device;
   executable instructions disposed in an electronic communication path between the printer and the computing device, wherein the executable instructions are configured to implement a method comprising:
      adding to a print job a new address as a destination for a status message;
      performing a pre-print analysis of the print job, wherein the pre-print analysis comprises communicating with a debit system and pre-authorizing the print job by verifying sufficient funds in a user account;
      determining if the print job should be sent to a printer based on the pre-print analysis;
      sending the print job to the printer;
      receiving the status message that includes actual performance information relating to the print job;
      communicating the actual performance to an accounting system; and
      communicating the status message to a monitor program.

23. The system of claim 22, wherein the executable instructions are included in an enhanced monitor.

24. The system of claim 22, wherein the executable instructions are included in a port manager.

25. The system of claim 22, wherein the executable instructions are included in a print assist.

26. The system of claim 22, wherein the executable instructions are included in a printer driver.

27. The system of claim 22, wherein the executable instructions are included in a print processor.

28. The system of claim 22, wherein the executable instructions are included in a print spooler.

* * * * *

UNITED STATES PATENT AND TRADEMARK OFFICE
CERTIFICATE OF CORRECTION

PATENT NO. : 7,301,663 B2 Page 1 of 1
APPLICATION NO. : 10/401483
DATED : November 27, 2007
INVENTOR(S) : Andrew R. Ferlitsch It is certified that error appears in the above-identified patent and that said Letters Patent is hereby corrected as shown below:

Col. 1, line 48 please delete "counting" and replace it with --accounting--.

Col. 2, line 14 please delete "monitor." and replace it with --monitor--.

Signed and Sealed this

Twentieth Day of May, 2008

JON W. DUDAS
*Director of the United States Patent and Trademark Office*